(12) United States Patent
McCowen

(10) Patent No.: US 8,209,926 B2
(45) Date of Patent: Jul. 3, 2012

(54) ASSEMBLY FOR REDUCING ICE DAMMING ON ROOF

(76) Inventor: Richard Leon McCowen, Beaverton, MI (US)

(*) Notice: Subject to any disclaimer, the term of this patent is extended or adjusted under 35 U.S.C. 154(b) by 23 days.

(21) Appl. No.: 12/791,105

(22) Filed: Jun. 1, 2010

(65) Prior Publication Data

US 2010/0307076 A1  Dec. 9, 2010

Related U.S. Application Data

(60) Provisional application No. 61/185,252, filed on Jun. 9, 2009.

(51) Int. Cl.
  *E04B 1/70* (2006.01)
  *E04F 17/00* (2006.01)
(52) U.S. Cl. .......... 52/302.3; 52/24; 52/173.3; 52/11
(58) Field of Classification Search .......... 52/24, 25, 52/26, 15, 79.9, 12, 11, 591.5, 579, 302.6, 52/173.3, 213, 878, 880, 302.3; 219/213; 343/878, 880
See application file for complete search history.

(56) References Cited

U.S. PATENT DOCUMENTS

| | | | | |
|---|---|---|---|---|
| 966,187 A * | 8/1910 | Fischer et al. | ............... | 52/302.3 |
| 3,094,303 A * | 6/1963 | Belger | ........................... | 248/514 |
| 4,078,633 A * | 3/1978 | Fahy | ............................. | 182/82 |
| 4,291,673 A | 9/1981 | Deutz | | |
| 4,333,444 A | 6/1982 | Sell | | |
| 4,432,341 A | 2/1984 | Howe et al. | | |
| 4,663,909 A * | 5/1987 | Ogino et al. | .................. | 52/302.3 |
| 4,674,249 A * | 6/1987 | Bennett, Jr. | ................... | 52/302.3 |
| 5,067,586 A * | 11/1991 | Myers | .............................. | 182/45 |
| 5,570,557 A * | 11/1996 | Kwiatkowski et al. | .......... | 52/630 |
| 5,571,338 A * | 11/1996 | Kadonome et al. | ............ | 136/251 |
| 5,786,563 A * | 7/1998 | Tiburzi | ......................... | 219/213 |
| 5,890,324 A | 4/1999 | Maanum | | |
| 6,282,858 B1 * | 9/2001 | Swick | .............................. | 52/533 |
| 6,591,976 B1 * | 7/2003 | Barnett | .......................... | 198/801 |
| 6,875,954 B2 * | 4/2005 | DeBenedetto et al. | ......... | 219/213 |
| 7,806,232 B2 * | 10/2010 | Thomas et al. | .................. | 182/45 |
| 2005/0271852 A1 * | 12/2005 | Solomon et al. | ................ | 428/58 |
| 2006/0174552 A1 * | 8/2006 | Nocito | ............................... | 52/95 |
| 2008/0087320 A1 * | 4/2008 | Mapes et al. | .................. | 136/244 |
| 2009/0293383 A1 * | 12/2009 | Venter et al. | .................. | 52/173.3 |

FOREIGN PATENT DOCUMENTS

JP          2006057397 A  *  3/2006

OTHER PUBLICATIONS

Machine translation of Kutsuwada JP 2006057397.*

* cited by examiner

*Primary Examiner* — Brian Glessner
*Assistant Examiner* — Brian D Mattei
(74) *Attorney, Agent, or Firm* — Kane & Co. PLC

(57) ABSTRACT

An assembly for reducing ice damming along a roof using solar energy is provided including at least one tabular solar collection panel having an upper surface and an opposing lower surface shaped in a rectangular shape. Each panel includes a plurality of holes extending entirely through the panel. A plurality of pads is attached to the opposing surface of said tabular panel for spacing the entire tabular panel from a substrate such as a roof surface. Each panel further includes a "U" shaped offset member attached to an interconnecting member which in turn is attached to the assembly.

19 Claims, 7 Drawing Sheets

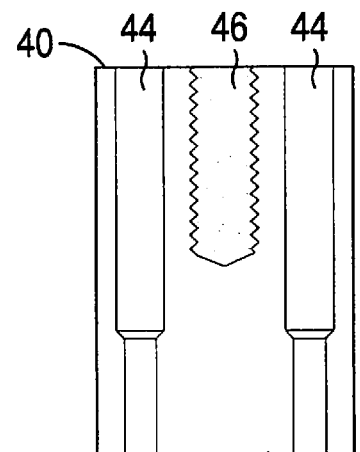
FIG. 6 Section A-A
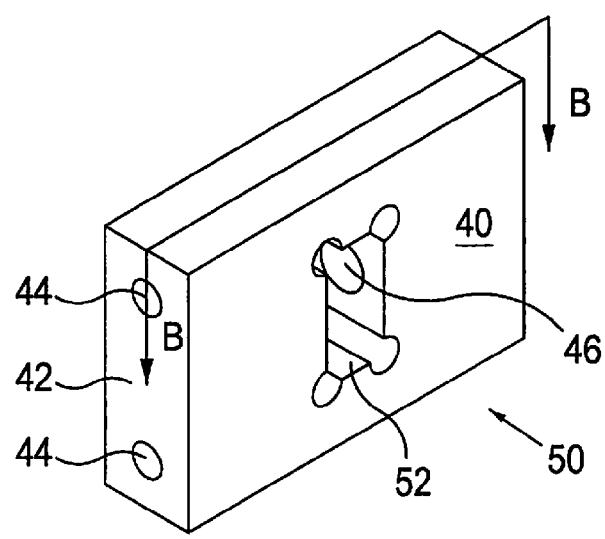
FIG. 7
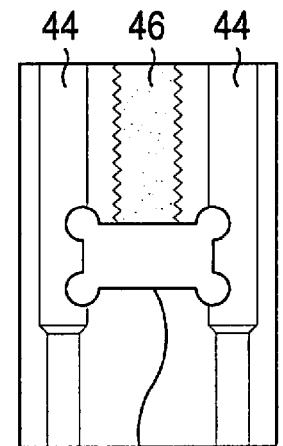
FIG. 8 Section B-B

ASSEMBLY FOR REDUCING ICE DAMMING ON ROOF

RELATED APPLICATION

This application claims benefit of the filing date of U.S. Provisional Patent Application Ser. No. 61/185,252, filed on Jun. 9, 2009 which is herein incorporated by reference.

BACKGROUND OF THE INVENTION

1. Field of the Invention

The present invention generally relates to a method and apparatus for passively reducing the chance of ice and snow buildup on a structure, more specifically a rooftop, and particularly a roof containing a soffit or eave.

2. Description of the Related Art

Ice damming on the roofs of homes is often common place. Heat loss from the dwelling passes through the roof and melts snow that has accumulated on the roof. The water from the snowmelt then runs down the roof surface under the snow pack until the water freezes on a part of the roof at ambient temperature. As the process continues, the frozen water builds up creating a dam which contains the incoming snowmelt. This in turn creates a pool of water which penetrates the roofing material and enters the dwelling.

Numerous techniques have been devised for preventing ice damming. One old technique involves the physical removal of snow from the lower edge of the roof using a shovel or scoop attached to a long handle. Another method includes placing impenetrable barriers below the roofing material far up the roof slope above where ice damming will occur. Yet another method includes the use of heat tape or wire placed in a pattern along the lower surface of the roof above the eave or soffit so that the temperature is locally raised above the freezing point allowing the snow melt to run off the roof or into a gutter system.

A few prior art devices have attempted to use lenses and reflectors to focus solar energy onto a thermally receptive component placed into direct contact with an ice dam. The thermally receptive region is then heated via solar energy melting the snow underneath the contacted region. This is a reactive solution to ice damming which has already occurred and will fail to operate without sunlight.

Other devices use angular shaped metallic structures held in direct contact with the roof to absorb solar radiation creating a locally warmed region. These solutions only prevent local ice formations from occurring, leaving the areas in between the collectors unaffected. Further these structures only operate when sunlight is present. This is an inadequate solution to the problem of ice damming, because the amount of sunlight during winter months is at a minimum. These issues can be minimized or eliminated by the use of a new passive assembly for reducing ice damming on roof which operates under a wide variety of conditions.

SUMMARY OF THE INVENTION

An assembly for reducing ice damming along a roof is provided including at least one tabular panel having an upper surface and an opposing lower surface shaped in a rectangular shape. Each panel includes a plurality of holes extending entirely through the panel. A plurality of pads is attached to the opposing surface of said tabular panel for spacing the tabular panel from a substrate such as a roof surface.

Another form of the invention includes at least one tabular panel having an upper surface and an opposing lower surface shaped in a rectangular shape. Each panel includes a plurality of holes arranged in a pattern extending entirely through the panel. A plurality of pads is attached to the opposing surface of said tabular panel for spacing the tabular panel from a substrate such as a roof surface. Each panel further includes a "U" shaped offset member attached to the assembly.

In still another form of the invention including at least one tabular panel having an upper surface and an opposing lower surface shaped in a rectangular shape. Each panel includes a plurality of holes extending entirely through the panel. A plurality of pads is attached to the opposing surface of said tabular panel for spacing the tabular panel from a substrate such as a roof surface. Each panel further includes a "U" shaped offset member attached to an interconnecting member which in turn is attached to the assembly.

BRIEF DESCRIPTION OF THE DRAWING FIGURES

FIG. 6 is a cross sectional view of a pad taken at section A-A in FIG. 4;

FIG. 7 is an isometric view of an alternate pad;

FIG. 8 is a cross sectional view of an alternate pad taken at section B-B in FIG. 7;

DETAILED DESCRIPTION OF THE INVENTION

Figure 1:
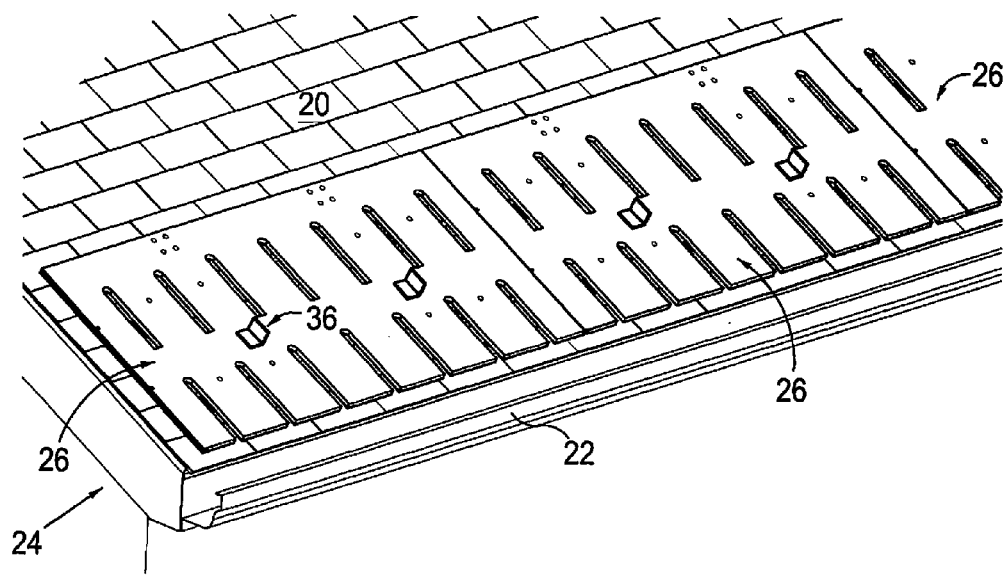
FIG. 1 is a schematic diagram illustrating one embodiment of the invention deployed on a roof of a house.

For purposes of the following description, the terms "upper," "lower," "right," "left," "rear," "front," "vertical," "horizontal," and derivatives and synonyms thereof shall relate to the invention as displayed in the respective figure referenced in that portion of the detailed description. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Specific dimensions and other physical characteristics relating to the embodiments disclosed herein are not to be considered as limiting, unless the specification and claims expressly state otherwise. As used herein, the term "soffit" describes the underside of any construction component like the underneath of an arch or the underneath of a flight of stairs. When used in association with roofing, a soffit refers to the underside of the ceiling or a roof overhang, cantilever, or mansard.

The reader can obtain a better understanding of the invention by reference to the drawing figures, and in particular to FIGS. 1-10. The purpose of the invention is to reduce the accumulation of snow along a roof of a dwelling or building where snow melt typically re-freezes resulting in a build-up of ice. All too often, heat loss from the structure causes snow on the roof to melt, allowing the resulting melt water to flow down slope. The snow melt tends to refreeze along this portion of the roof surface because there is no heat loss in the area above the soffit. As more melt water flows onto this ice, an ice sheet begins to form. Over time ice build-up may become substantial, forming large ice stalagmites that cascade over the edge, presenting a hazard to people who walk below. Moreover and not uncommon is that the ice causes a pooling of unfrozen water which migrates up slope beneath any shingling or roof treatment where it penetrates the interior of the dwelling or structure. The instant invention is intended to prevent such from occurring.

FIG. 1 illustrates a portion of a typical pitched roof 20 having a gutter trough 22 mounted to the fascia board where run-off is collected and diverted to a downspout. Also shown is one embodiment 24 of the invention in the form of an array of panel assemblies 26 placed along the lower portion of the roof 20 nearest the gutter trough 22. The series of panels assemblies 26 form a covering above and separated from the roof surface 20.

The panels 26 may have any one of a variety of two dimensional forms depending in large part upon the intended area of coverage. In a preferred embodiment of the invention, panels 26 are generally planar in shape each having a length (l) greater than its width (w), and a thickness (t) being a fraction of its width. More specifically panels 26 include an upper surface 28, an opposite lower surface 30, and a common peripheral edge 32 that defines the geometric form of the panel. Panel 26 also includes a number of holes or passages 34 formed therein at intervals, and extending completely through the panel 26.

Figure 15:
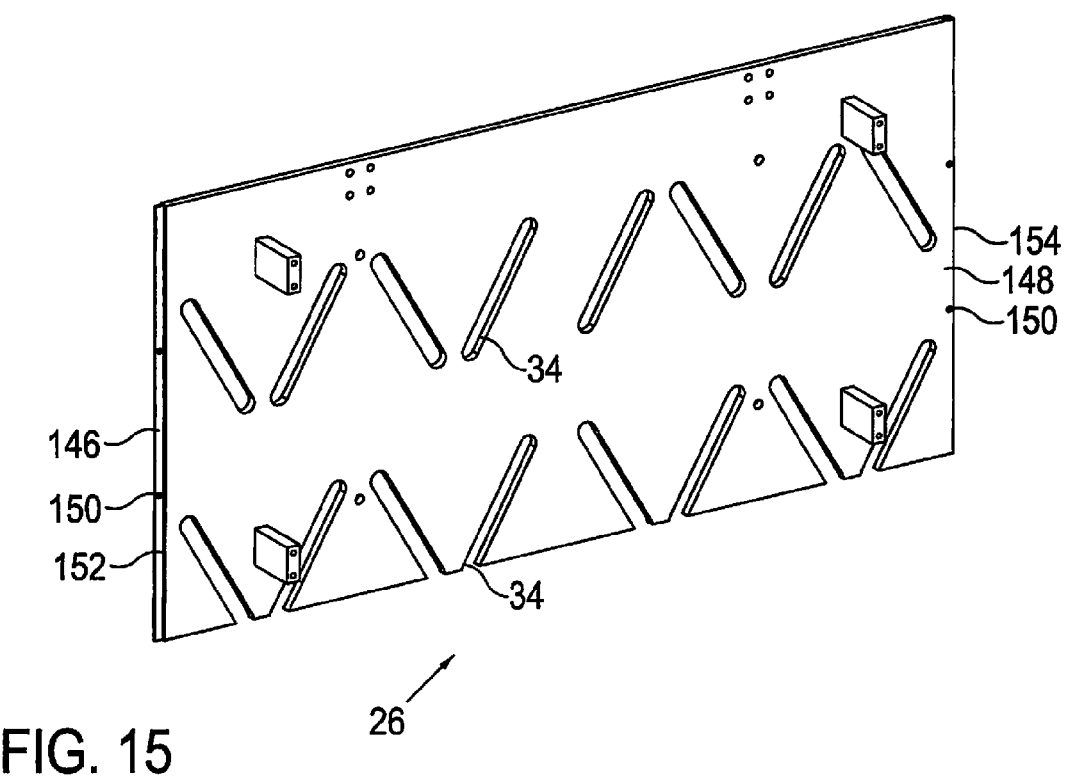
FIG. 15 is an oblique view of an alternate embodiment of the invention.

The holes 34 may be in any one of a number of different patterns and orientations depending upon the desires of the manufacturer that are found to be appealing aesthetically. In a preferred embodiment holes 34 may be arranged in rows and columns relative to the panel 26 although it is contemplated that other configurations may be used including chevrons (FIG. 15), herring bone, diamond, or even random patterns.

Although the pattern of the holes 34 may be varied, a sufficient number of holes should be placed in the panel 26 to allow water to pass through the panel and onto the roof 20 and to let water vapor pass from beneath the panel 26 and into the ambient air. During warmer periods, these holes 34 allow snow contained on the panel to melt and pass through the panel 26, onto the roof 20. During colder periods, such as when snow located on the panel is no longer melting, the holes 34 assist by retaining new snowfall to the panel 26 creating a thermally insulative layer of snow.

Additionally, the holes 34 serve to inhibit aerodynamic lift created by airflow across the panel 26 by breaking up the airflow. Optional vortex generators 36 in the form of small tabs may be attached to either or both of the upper or lower surfaces 28, 30 to further inhibit the creation of aerodynamic lift or to direct wind currents into desired locations of the panel 26. These vortex generators 36 further operate to retain snow accumulations on the panel 26, and break up the snow as it becomes dislodged from the panel preventing large sheets of snow from sliding off the roof 20.

Figure 10:
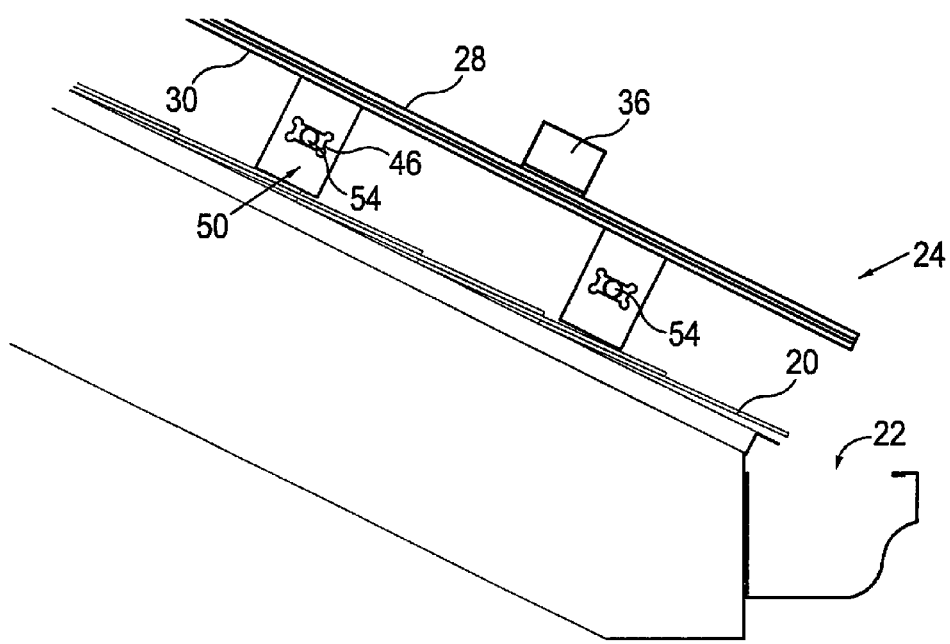
FIG. 10 is an end view of the invention with alternate pads mounted along a lower portion of a roof.

As demonstrated in FIGS. 1 and 10, panels 26 are intended to be placed on those portions of the roof where ice damming commonly occurs. These locations may vary depending upon the orientation of the dwelling or structure relative to the prevailing winds of a region and the orientation of the house relative to the sun. The panels 26 include pads 38 attached to the lower surface 30 of the panel 26 which extend away therefrom a predefined distance to space the panel 26 a set distance away from the roof surface 20. The distance the panel 26 is spaced above the roof may vary depending upon local conditions, but it is anticipated that the pads 38 be at least one inch tall and as much as four inches tall. Depending upon the size of each panel 26, the number of pads may vary, but it is anticipated that at least four pads 38 will be used. Additional support may be necessary depending upon the anticipated amount of snow accumulation in a geographic area, or to assist in retaining the panel 26 to the roof 20.

Each pad, best shown in FIGS. 5-8, may generally be substantially a solid rectangular shape with one edge 40 intended to engage the panel's 26 lower surface 30 and the opposing edge 32 intended to rest upon the roof surface 20. It may be desired to modify the edge 42 in a manner that increases the traction of the pad 38 relative to the roof surface 20. One such option is to provide relief to the edge 42 to form teeth, or serrations that tend to bite into the roof surface 20. Alternatively it may be desired to fix a polymeric pad or sheet to the edge 42 to create friction with the roof surface.

Panel Retention and Orientation

Pads 38 are ideally installed along the panel 26 at intervals of 16" or 24" or multiples thereof along direction 'l' so that the pads may be fastened to the roofs 20 truss structure (not shown) via roof mounting holes 44 which are countersunk into edge 40 of the pad. The pad 38 further contains installation holes 46 which are also placed into edge 40 of the pad. These installation holes 46 correspond to similar hole locations 48 drilled through the panel, allowing the pad's 38 edge 40 to be fastened to the lower surface 30 of the panel.

As reflected in an alternate form of the invention shown in FIGS. 7 and 8, pad 50 may also optionally include a transverse passage 52 extending there through. Optional passage 52 may be of substantially any desired shape albeit a rectangular form is shown in the figures. If optional passage 52 is placed into pad 50, then the pads 50 should be installed in a registered alignment with one another along the direction 'w' of the panel 26 so that the passages 52 are aligned for reasons that will become abundantly clear below.

In the form of the invention where pad 50 contains optional passage 52, an optional connector rod 54 having a length sufficient to extend between adjacent panels 26 may be received in the optional passage holes 52 of pad 50 to assist in keeping the panels 26 together. The dimensions of the optional connector rods 54 are such that they are held within the passage 54 by friction. It is further envisioned that the weight of the connector rods 54 will add to the overall weight of the panel system helping to anchor the panel array 24 to the roof 20 by friction. In areas where the pitch of the roof 20 is substantial, making it difficult to keep the panels in place by friction alone, strapping in the form of webbing or the like (not shown) may have a loop or other form of fastener received along the length of optional connector rod 54 and passed up over the peak of the roof to similar structures located on the opposite side of the house. The offsetting weight of the other structure would balance, keeping the panels from sliding off of the roof surface.

Figure 11:
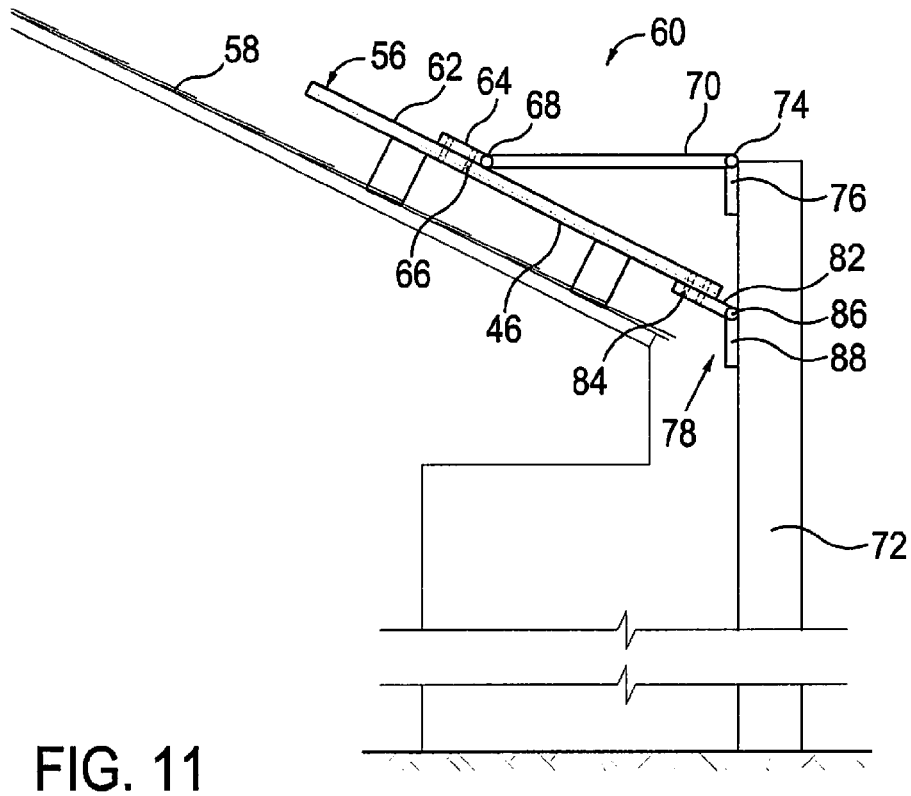
FIG. 11 is an end view of the invention with ground based support structure.
Figure 12:
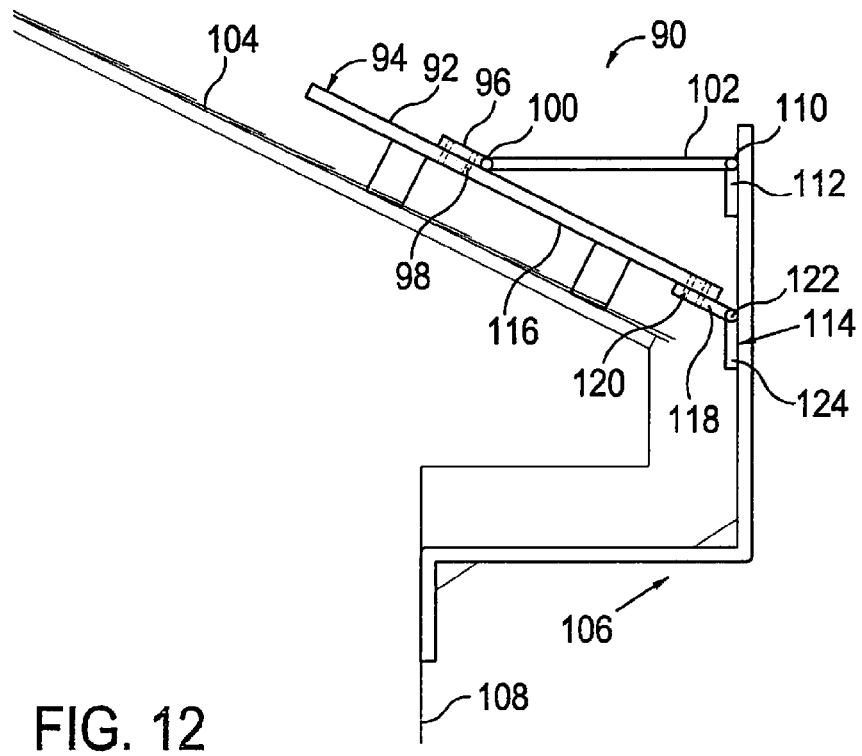
FIG. 12 is an end view of the invention with a brace.

Additional hinge based retention methods are also envisioned for retaining the panel assembly 56 on a roof 58. Several embodiments of these hinged restraints are shown in FIGS. 11 and 12. These embodiments may compliment or replace the anchoring methods associated with pads (38, 50).

A first external retention embodiment is shown at 60 in FIG. 11. This embodiment is attached to the upper surface 62 of the panel 56 via an attachment plate 64 containing a number of fastener holes 66. Fasteners are then driven through these holes 66 and into a face of the panel 56 anchoring the plate 64 in position. Plate 64 further contains a hinge 68 hingedly attached to an extension arm 70. The extension arm is sized in length to extend beyond the edge of the roof 58 and come adjacent to a ground based support structure 72 or pole. The extension arm 70 terminates into a second hinge 74 to which a support plate 76 is hingedly attached. The support plate 76 is then fastened or otherwise secured to the ground based supporting structure or pole 72. In this manner the two hinges, along with the length of the extension arm 70 and the position of the support plate 76 on the ground based support structure 72 allows the external retention structure to adapt to the angle and position of the panel 56 on the roof 58 during assembly and installation. After installation, the external retention embodiment controls the position of the panel 56.

A second external retention embodiment is shown at 78 in FIG. 11. This embodiment may be attached to either the lower 80 or upper surface 62 of the panel 56 via an attachment plate 82 containing a number of fastener holes 84. Fasteners are then driven through these holes 84 and into a face of the panel 56 anchoring the plate 82 in position. Plate 82 further contains a hinge 86 hingedly attached to a support plate 88 further attached to a ground based support structure 72, which may be a wooden 4×4 post.

A third external retention embodiment is shown at 90 in FIG. 12. This embodiment is attached to the upper surface 92 of a panel 94 via an attachment plate 96 containing a number of fastener holes 98. Fasteners are then driven through these holes 98 and into a face of the panel 94 anchoring the plate 96 in position. Plate 96 further contains a hinge 100 hingedly attached to an extension arm 102. The extension arm is sized in length to extend beyond the edge of the roof 104 and come adjacent to a brace 106 connected to a wall 108 supporting the roof 104. The extension arm 102 terminates into a second hinge 110 to which a support plate 112 is hingedly attached. The support plate is then fastened or otherwise secured to a brace 106 extending away from a wall 108 of the structure supporting the roof 104.

A fourth external retention embodiment is shown at 114 in FIG. 12. This embodiment may be attached to either the lower 116 or upper surface 92 of the panel 94 via an attachment plate 118 containing a number of fastener holes 120. Fasteners are then driven through these holes and into a face of the panel 94 anchoring the plate 118 in position. Plate 118 further contains a hinge 122 hingedly attaching a support plate 124. The support plate is then fastened or otherwise secured to a brace 106 extending away from a wall 108 of the structure supporting the roof 104.

Offset Structure

Figure 14:
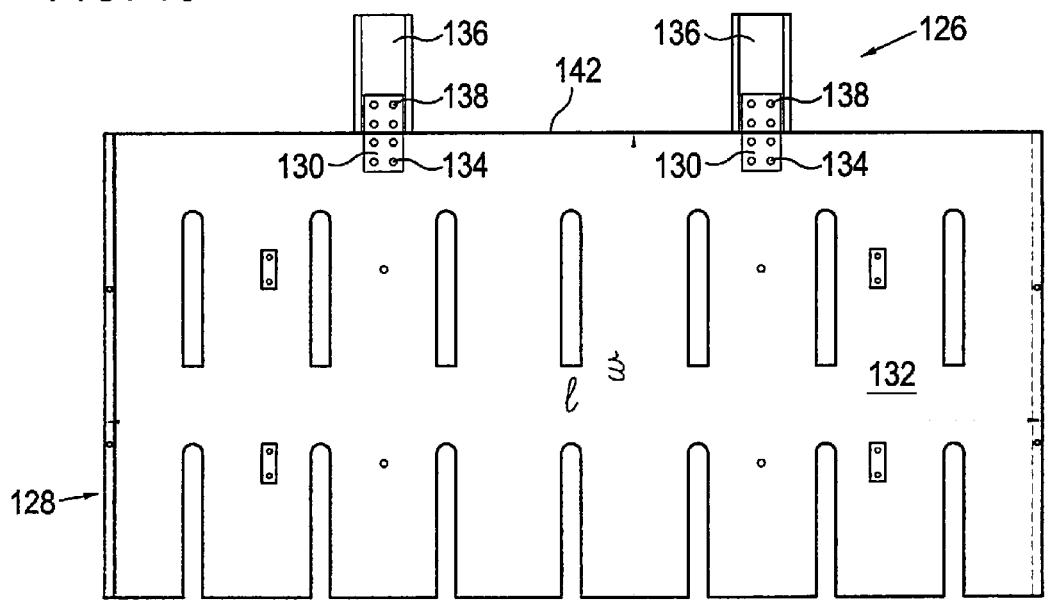
FIG. 14 is a plan view of the invention shown in FIG. 13.

In an additional embodiment of the invention an optional offset structure shown generally at 126 in FIG. 14 may be affixed to a panel assembly 128 through the use of one or more interconnecting components 130. The interconnecting components 130 may in turn, be attached to any location on the panel 128, but are preferably installed onto a lower surface 132 of the panel 128 and preferably oriented to face toward the roof's peak when the panel 128 is installed. The interconnect 130 is attached to the panel through the use of fasteners which are passed through a set of interconnect mounting holes 134 placed through the panel. The size and thickness of the interconnect 130 and the size and location of the fasteners are selected so that the interconnect is securely retained on the panel 128 when an offset attached member 136 is installed.

Attached to the interconnect 130 is an offset member 136. This member is attached through a set of member mounting holes 138 placed through the offset member 136. Fasteners are then passed through the member holes 138 and into the interconnect 130 anchoring the two parts together. The offset member 136 is typically aligned to lie parallel with the interconnect component 130, so that the offset member 136 extends toward the peak of the roof 140 when the panel assembly 128 is installed. In one preferred embodiment of the invention, the offset member 136 abuts the panel 128 at its upper edge 142 and extends towards the peak of the roof 140 a distance equivalent to the width (w) of the panel.

Figure 13:
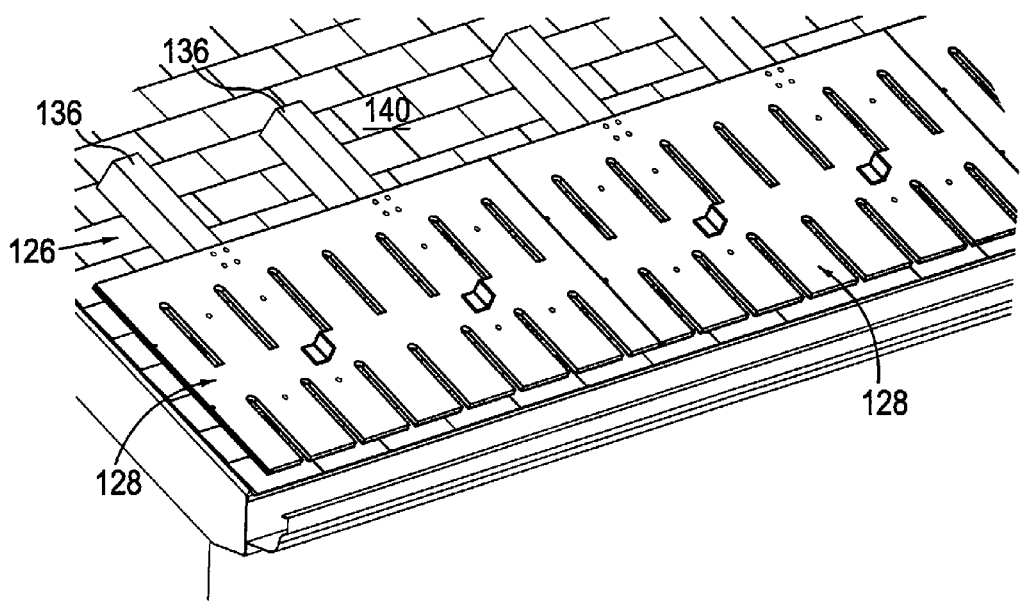
FIG. 13 is a schematic diagram illustrating a second embodiment of the invention deployed on a roof of a house.

The offset member 136 may be constructed of any shape and of any material, but in a first preferred embodiment of the offset structure, the offset member 136 is formed into a "U" shaped member as shown in FIGS. 13 and 14. The "U" shaped channel is preferably oriented so that the channel's edges face towards the roof 140. In this embodiment the "U" shaped offset member 136 is constructed of a material similar to that of the panel 128 itself. A second preferred embodiment also includes a "U" shaped member, however, in this embodiment an optional edge liner 144 (not shown), constructed preferably of felt or rubber, is affixed to the edges of the offset member 136 to protect the roof 140 from damage and wear caused by the offset member.

Tongue and Groove

Figure 2:
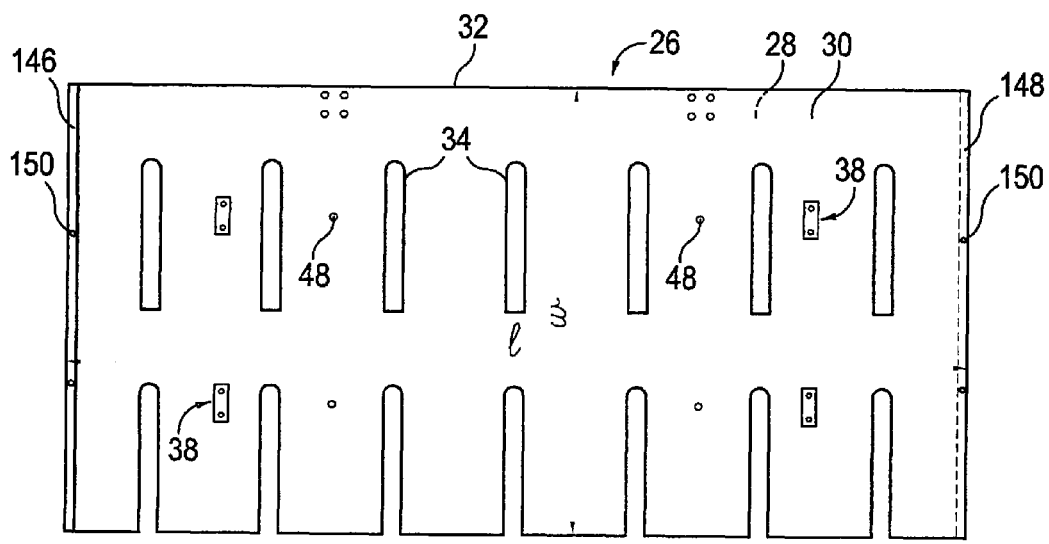
FIG. 2 is a plan view of the invention shown in FIG. 1.
Figure 3:
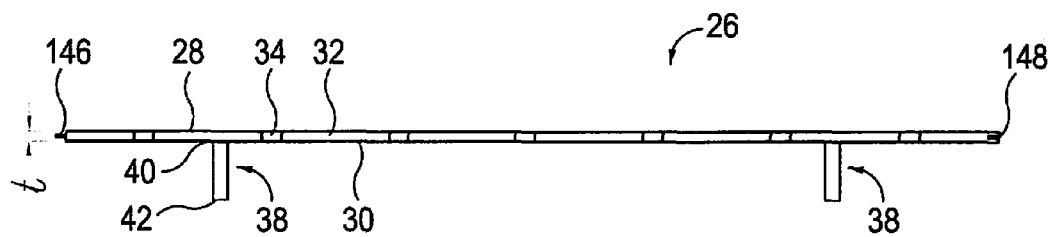
FIG. 3 is a front elevation of the invention shown in FIG. 2.
Figure 4:
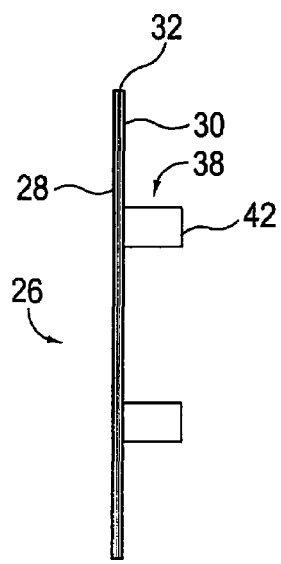
FIG. 4 is an end elevation of the invention shown in FIG. 2.
Figure 5:
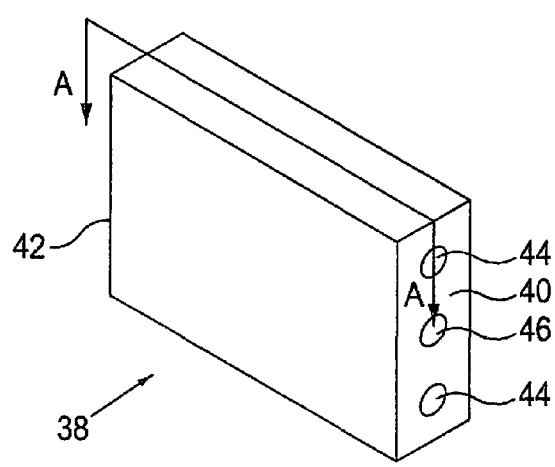
FIG. 5 is an isometric view of one of the pads shown in FIG. 3.
Figure 9:
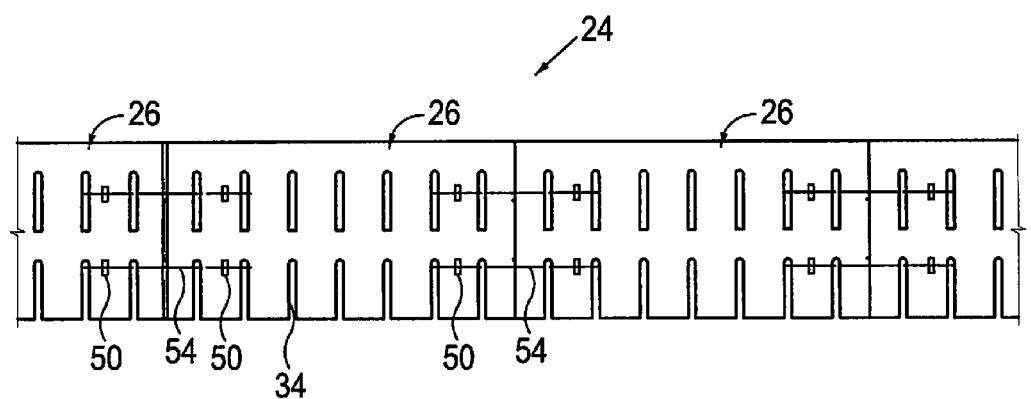
FIG. 9 is a bottom view of the invention.

As shown in FIGS. 2 and 3, each panel may have a tongue 146 formed at a first end and a groove 148 formed at an opposite end. Extending through the tongue and the groove ends are threaded edge holes 150. As the tongue end 152 of one panel is received within the groove end 154 of an adjacent panel 26, the threaded edge holes 150 are intended to be aligned. To keep the adjoining panels in place, fasteners are received in the edge holes 150 to secure the joint between the adjacent and joined panels 26.

Materials

The panel may be formed from a variety of materials including wood, wood composite, plastic or other polymer, and metal. In a preferred embodiment of the invention, the panels 26 are made from a semi-transparent to transparent polymer material such as a clear acrylic plastic plate having a dimension of approximately 4 feet long, 2 feet wide, and around one-half inch thick. Each panel 26 may also come in any one of a number of different colors although it is preferred that the color be one that transmits sunlight to the roof surface so as to directly heat the roof surface. This heat radiates upward from the roof structure, but is retained by the panel 26 before reaching the ambient air. This captured heat creates a warmed region beneath the panel assembly 26. In a preferred embodiment of the invention, a clear acrylic material is utilized. This material further serves to insulate the warmed region and prevents conductive heat losses through the panel 26.

Alternate embodiments of the panel created from opaque materials or metals may also be utilized, but to a slightly different effect. These opaque structures absorb thermal energy from the sunlight and radiate this energy as heat onto the roof 20. This warms the area beneath the panel. The panels otherwise operate similarly.

Installation of the Panels

In operation one or more panel assemblies 26 are installed on areas where ice damming is prone to occur. These panels may be laid along the roof surface and then joined together by the tongue and groove joints held by the fasteners. In a first embodiment, the panels are retained by the weight of the panel itself and the friction of the pads against the roofs 20 covering. In a second embodiment, panel assemblies 26 are fixed to the roof by inserting fasteners through the mounting holes 44 located in the pads 38, affixing the pad directly to the roofs support structure. In a third embodiment, the panel assemblies are placed onto the roof and connected with optional rods 54 passed through the holes 52 in adjacent pads 50. Webbing or straps (not shown) may be passed around the optional rods 54 and fixed to the roof 20 itself, or passed over the roof peak (not shown) to be attached to a corresponding panel system on the opposite edge of the roof. A fourth and fifth embodiment of the panel assembly (56, 94) may also be anchored to the roof (58, 104) through the use of one or more external retention features (60, 78, 90, and 114), these external retention controlling the position of the panel assembly (56, 94) on the roof.

Operation

Once the invention is mounted on the roof 20, sunlight striking the panel 26 will either pass though the panel, or be absorbed by the panel depending on its opacity. The sunlight reaching the roof 20 is absorbed by the roof 20 warming the roof and its adjacent airspace. This airspace is bounded on one side by the panel's 26 lower surface 30 which retains the heat in the airgap. Additional sunlight absorbed by the panel 26 in turn warms the panel heating both the lower 30 and upper surfaces 28 melting snowfall landing upon the surface during daylight hours. This sunlight warming action also adds to and retains the heat of the air located beneath the panel 26 melting any snow located thereunder. This further creates a warmed region which inhibits ice formation and prevents ice build up.

If any portion of the panel 26 is located over a warmed part of the structure or roof 20, the heat loss from the structure passing through the roof can also be retained in the air gap located between the panel 26 and the roof 20. This warmed region is sheltered from snowfall and from winds which would lower the temperatures in this region. The sheltering effect combined with retention of heat lost by the structure further helps to prevent ice damming from occurring by allowing snowmelt to pass through the warmed region underneath the panel 26 preventing it from refreezing.

New snow fall may occasionally accumulate on the panel 26, particularly during evening hours or when the sunlight is obscured. During these periods the passages 34 and vortex generators 36 assist to retain the layer of snow on the upper surface 28 of the panel 26. As this layer of snow accumulates it acts like a blanket of insulation which helps to retain residual heat located in the air gap beneath the panel 26 and above the roof 20. The insulative factor of the snow further helps to capture any new heat loss from the structure adding its warmth to the air gap. The panel additionally separates the layer of snow from the snowmelt passing underneath the panel 26 preventing frozen snow from lowering the temperature of the snowmelt. The net effect is that snow accumulating on the upper surface 28 of the panel 26 further assists the retention of heat, lowering the chances of the liquid snowmelt from refreezing on the roof 20.

During the next warming period, the snow accumulated upon the panel will melt passing from the upper surface 28 of the panel 26, through passages 34, and onto the roof 20 where it is directed to a gutter 22 if present. Vortex generators 36 further prevent the now melting snow from sliding off the roof in a sheet, as any snow traversing the upper surface of the panel will be broken up or retained by the vortex generators 36. This prevents injury to persons or property located beneath the roof's 20 soffit by controlling the release of snow.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents. The embodiments of the invention in which an exclusive property or privilege is claimed are defined below.

Having now described the features, discoveries and principles of the invention, the manner in which the invention is constructed and operated, the characteristics of the invention, and the advantageous, new and useful results obtained; the new and useful structures, devices, elements, arrangements, parts and combinations are set forth in the appended claims.

The invention claimed is:

1. An assembly for collecting solar energy to reduce ice damming along a roof, comprising;
    a tabular panel shaped solar collector having an upper surface and a lower opposing surface including a plurality of water drainage passages extending entirely there through;
    a plurality of support pads containing an upper and lower edge, wherein each support pad is joined along said upper edge to said lower opposing surface of said tabular panel and wherein said lower edge engages an exposed exterior surface of a roof, spacing entirety of said tabular panel away from said exposed exterior surface of said roof forming an airgap of generally uniform thickness extending between said lower opposing surface of said tabular panel and said exposed exterior surface of said roof;
    wherein said tabular panel is placed on said exterior surface of said roof such that said panel extends beyond the peripheral edge of said roof; and
    wherein said tabular panel assembly passes solar radiation through said tabular panel to said exposed exterior surface of said roof thereby heating said airgap.

2. The assembly in claim 1 wherein one or more of said pads contain a mounting hole for mounting said assembly to the roof.

3. The assembly in claim 1 wherein said plurality of water drainage passages contains a pattern.

4. The assembly of claim 1 wherein said tabular panel is clear.

5. The assembly of claim 1 wherein said tabular panel is opaque.

6. The assembly of claim 1 wherein said tabular panel is rectangular in shape.

7. The assembly of claim 1 further comprising a plurality of offset members attached to, and extending away from, a common peripheral edge of said tabular panel shaped solar collector.

8. The assembly in claim 1 wherein an external retention support is attached to said assembly.

9. The assembly of claim 7 wherein said plurality of offset members are "U" shaped.

10. The assembly in claim 8 wherein said external retention support further contains one or more hinges.

11. The assembly in claim 8 wherein said external retention support is attached to one or more grounded support poles.

12. The assembly in claim 8 wherein said external retention support is attached to a brace connected to a roof supporting structure.

13. The assembly of claim 9 wherein said plurality of "U" shaped offset members adjoin said common peripheral edge of said panel via an interconnecting support member.

14. An assembly for collecting solar energy to reduce ice damming along a roof, comprising;

a rectangular tabular panel shaped solar collector having an upper surface and a lower opposing surface including a pattern of rectangular shaped water drainage passages extending entirely there through;

a plurality of "U" shaped offset members, having a base portion and a plurality of edge portions extending away from said base portion, attached to a common peripheral edge of said tabular panel, extending away from said panel at a substantially perpendicular angle, and oriented so that said base portion of said "U" shaped offset member lies in substantially the same plane as said lower opposing surface of said tabular panel and wherein said plurality of edges located on said "U" shaped channel are oriented toward said exposed exterior surface of said roof;

a plurality of support pads containing an upper and lower edge, wherein each support pad is joined along said upper edge to said lower opposing surface of said tabular panel and said lower edge engages an exposed exterior surface of a roof, spacing entirety of said tabular panel away from said exposed exterior surface of said roof forming an airgap of generally uniform thickness extending between said lower opposing surface of said tabular panel, said plurality of "U" shaped offset members, and said exposed exterior surface of said roof;

wherein said tabular panel assembly passes solar radiation through said tabular panel onto said exposed exterior of said roof wherein the solar radiation is absorbed by said exposed exterior surface of said roof thereby heating said airgap;

wherein said tabular panel is placed on said exterior surface of said roof such that said panel extends beyond the peripheral edge of said roof; and wherein said upper surface of said tabular panel is substantially parallel to said exposed exterior surface of said roof.

15. An assembly for collecting solar energy to reduce ice damming along a roof, comprising;

a rectangular shaped tabular panel shaped solar collector having an upper surface and a lower opposing surface including a pattern of rectangular shaped water drainage passages covering the entirety of said tabular panel and extending entirely there through;

a plurality of "U" shaped offset members, having a base portion and a plurality of edge portions extending away from said base portion, attached to a common peripheral edge of said tabular panel, extending away from said panel at a substantially perpendicular angle, and oriented so said base portion of said "U" shaped offset member lies in substantially the same plane as said lower opposing surface of said tabular panel and wherein said plurality of edges located on said "U" shaped channel are oriented toward, but do not touch, said exposed exterior surface of said roof;

a plurality of support pads containing an upper and lower edge, wherein each support pad is joined along said upper edge to said lower opposing surface of said tabular panel and said lower edge engages an exposed exterior surface of a roof, spacing the entirety of said tabular panel away from said exposed exterior surface of said roof forming a airgap of generally uniform thickness extending between said lower opposing surface of said tabular panel, said plurality of "U" shaped offset members, and said exposed exterior surface of said roof;

an interconnecting member attached to said tabular shaped panel;

wherein said tabular panel assembly passes solar radiation through said tabular panel onto said exposed exterior of said roof wherein the solar radiation is absorbed by said exposed exterior surface of said roof thereby heating said airgap;

wherein said tabular panel is placed on said exterior surface of said roof such that said panel extends beyond the peripheral edge of said roof; and wherein said tabular panel is placed on said exterior surface of said roof such that it lies substantially parallel to said exposed exterior surface of said roof.

16. The assembly in claim 1 wherein the solar radiation passed through said tabular panel is partially absorbed by said exposed exterior surface of said roof thereby heating said airgap.

17. The assembly in claim 1 wherein the solar radiation passed through said tabular panel is partially absorbed by said tabular panel thereby heating said airgap.

18. The assembly in claim 9 wherein said plurality of "U" shaped offset members are oriented to extend away from said peripheral edge of said panel at a substantially perpendicular angle; and wherein said base portion of said "U" shaped offset member is oriented to lie in substantially the same plane as said lower surface of said tabular panel and wherein said edges of said "U" shaped channel are oriented toward said exposed exterior surface of said roof.

19. The assembly in claim 9 wherein said "U" shaped offset members do not contact said exposed exterior surface of said roof.

* * * * *